US008894259B2

(12) United States Patent
Haugan et al.

(10) Patent No.: US 8,894,259 B2
(45) Date of Patent: Nov. 25, 2014

(54) DARK FIELD ILLUMINATOR WITH LARGE WORKING AREA

(75) Inventors: Carl E. Haugan, St. Paul, MN (US);
Steven K. Case, St. Louis Park, MN (US); Beverly Caruso, legal representative, St. Louis Park, MN (US);
David M. Kranz, Minneapolis, MN (US); Steven A. Rose, Minneapolis, MN (US); Mark R. Schoeneck, Bloomington, MN (US)

(73) Assignee: CyberOptics Corporation, Golden Valley, MN (US)

( * ) Notice: Subject to any disclaimer, the term of this patent is extended or adjusted under 35 U.S.C. 154(b) by 662 days.

(21) Appl. No.: 12/564,131

(22) Filed: Sep. 22, 2009

(65) Prior Publication Data

US 2011/0069507 A1    Mar. 24, 2011

(51) Int. Cl.
*F21V 8/00* (2006.01)

(52) U.S. Cl.
CPC .................................. *G02B 6/0096* (2013.01)
USPC .............. 362/551; 362/558; 348/92; 348/146

(58) Field of Classification Search
USPC ........... 362/551, 16, 552, 558, 297, 298, 301, 362/302, 304, 305, 348, 349; 356/237.4, 356/237.5; 348/92, 146
See application file for complete search history.

(56) References Cited

U.S. PATENT DOCUMENTS

| 1,577,388 | A |   | 5/1923  | Twyman         |         |
|-----------|---|---|---------|----------------|---------|
| 4,677,473 | A |   | 6/1987  | Okamoto et al. |         |
| 4,750,798 | A | * | 6/1988  | Whitehead      | 385/133 |
| 4,795,913 | A |   | 1/1989  | Blessing et al.|         |
| 4,799,175 | A |   | 1/1989  | Sano et al.    |         |
| 4,896,211 | A |   | 1/1990  | Hung           |         |
| 4,978,224 | A |   | 12/1990 | Kishimoto      |         |
| 4,993,826 | A |   | 2/1991  | Yoder          |         |

(Continued)

FOREIGN PATENT DOCUMENTS

| DE | 202008004430 | 1/2009 |
|----|--------------|--------|
| EP | 0301255      | 2/1989 |

(Continued)

OTHER PUBLICATIONS

Martin, "A practical Guide to Machine Vision Lighting", Advance Illumination, Rochester, VT, United States, Oct. 2007.

(Continued)

*Primary Examiner* — Sharon Payne
(74) *Attorney, Agent, or Firm* — Christopher R. Christenson; Kelly, Holt & Christenson, PLLC

(57) ABSTRACT

An illuminator is described which may be used with large inspection areas and which provides a dark field illumination pattern that is spatially uniform, illuminates from consistent angles, has high efficiency, and is smaller than existing solutions. A light pipe has a first end proximate an object to be illuminated and a second end opposite the first end and spaced from the first end. The light pipe also has at least one reflective sidewall. The first end of the light pipe includes an exit aperture and the second end has at least one opening to allow at least one image acquisition device to view the surface therethrough. At least one light source is configured to provide illumination in the light pipe. The object is illuminated by the first end of the light pipe by illumination at a selected elevation angle and substantially all azimuth angles.

23 Claims, 23 Drawing Sheets

(56) References Cited

U.S. PATENT DOCUMENTS

| | | | |
|---|---|---|---|
| 5,039,868 A | 8/1991 | Kobayashi et al. | |
| 5,058,178 A | 10/1991 | Ray | |
| 5,058,982 A | 10/1991 | Katzir | |
| 5,060,065 A | 10/1991 | Wasserman | |
| 5,086,397 A | 2/1992 | Schuster et al. | |
| 5,153,668 A | 10/1992 | Katzir | |
| 5,245,421 A | 9/1993 | Robertson | |
| 5,260,779 A | 11/1993 | Wasserman | |
| 5,291,239 A | 3/1994 | Jackson | |
| 5,347,363 A | 9/1994 | Yamanaka | |
| 5,455,870 A | 10/1995 | Sepai et al. | |
| 5,517,234 A | 5/1996 | Straayer | |
| 5,550,583 A | 8/1996 | Amir | |
| 5,577,833 A * | 11/1996 | English et al. | 362/297 |
| 5,684,530 A | 11/1997 | White | |
| 5,696,591 A | 12/1997 | Bilhorn | |
| 5,822,055 A | 10/1998 | Tsai | |
| 5,825,495 A | 10/1998 | Huber | |
| 5,880,772 A | 3/1999 | Kalnajs | |
| 6,020,957 A | 2/2000 | Rosengaus et al. | |
| 6,023,663 A | 2/2000 | Kim | |
| 6,175,107 B1 | 1/2001 | Juvinall | |
| 6,222,624 B1 | 4/2001 | Yonezawa | |
| 6,362,877 B1 | 3/2002 | Kobayashi et al. | |
| 6,577,405 B2 | 6/2003 | Kranz et al. | |
| 6,603,103 B1 | 8/2003 | Ulrich et al. | |
| 6,633,375 B1 | 10/2003 | Veith et al. | |
| 6,750,899 B1 | 6/2004 | Fishbaine et al. | |
| 6,757,966 B2 | 7/2004 | Inoue et al. | |
| 6,850,855 B2 | 2/2005 | Kawai et al. | |
| 7,019,826 B2 | 3/2006 | Vook et al. | |
| 7,027,639 B2 | 4/2006 | Fishbaine et al. | |
| 7,075,565 B1 | 7/2006 | Raymond et al. | |
| 7,270,457 B2 * | 9/2007 | Guo et al. | 362/555 |
| 7,310,438 B2 | 12/2007 | Prince | |
| 7,372,632 B2 | 5/2008 | Lizotte | |
| 7,394,084 B2 | 7/2008 | Kuriyama et al. | |
| 7,460,219 B2 | 12/2008 | Jung et al. | |
| 7,828,472 B2 * | 11/2010 | Liu et al. | 362/558 |
| 8,098,372 B2 | 1/2012 | Eitan et al. | |
| 2002/0089664 A1 | 7/2002 | Shibata et al. | |
| 2003/0039388 A1 | 2/2003 | Ulrich et al. | |
| 2003/0110610 A1 | 6/2003 | Duquette et al. | |
| 2003/0179369 A1 | 9/2003 | Feldman et al. | |
| 2003/0227618 A1 | 12/2003 | Some | |
| 2004/0156539 A1 | 8/2004 | Jansson et al. | |
| 2005/0219518 A1 | 10/2005 | Komgut | |
| 2005/0259245 A1 | 11/2005 | Cemic et al. | |
| 2006/0062013 A1 * | 3/2006 | Imade | 362/551 |
| 2011/0069154 A1 | 3/2011 | Case | |
| 2011/0069878 A1 | 3/2011 | Case | |
| 2011/0075156 A1 | 3/2011 | Patel et al. | |
| 2011/0090333 A1 | 4/2011 | Haugan et al. | |
| 2011/0102575 A1 | 5/2011 | Case et al. | |
| 2011/0175997 A1 | 7/2011 | Case et al. | |
| 2012/0133920 A1 | 5/2012 | Skunes et al. | |
| 2012/0327215 A1 | 12/2012 | Case et al. | |

FOREIGN PATENT DOCUMENTS

| | | |
|---|---|---|
| EP | 0994646 | 4/2000 |
| EP | 1578186 A2 | 9/2005 |
| EP | 1694109 A2 | 2/2006 |
| GB | 2271683 | 4/1994 |
| GB | 2417072 A | 2/2006 |
| GB | 2444409 | 6/2008 |
| JP | 61134718 | 6/1986 |
| JP | 6229875 | 12/1987 |
| JP | 63011642 | 1/1988 |
| JP | 02268260 | 11/1990 |
| JP | 08327561 | 12/1996 |
| JP | 2002271099 A | 9/2002 |
| JP | 2006324599 A | 11/2006 |
| WO | WO98/19200 A1 | 5/1998 |
| WO | WO 00/26640 | 5/2000 |
| WO | WO 00/38494 | 6/2000 |
| WO | WO 01/96839 A1 | 12/2001 |
| WO | WO2009014940 A2 | 1/2009 |
| WO | WO 2009/094489 | 7/2009 |

OTHER PUBLICATIONS

Scharstein and Szeliski, "A Taxonomy and Evaluation of Dense Two-Frame Stereo Correspondence Algorithms"Microsoft Research, Microsoft Corporation, Redmond, WA.

U.S. Appl. No. 12/939,267, filed Nov. 4, 2010.

Kang,Web, Zitinick, and Takeo, "A Multibaseline Stereo System with Active Illumination and Real-time Image Acquisition."

Collins, "A Space-Sweep Approach to True Multi-Image Matching" University of Massachusetts, Amherst, MA.

CyberOptics, "Flex Ultra TM HR, Automated Optical Inspection", CyberOptics Corporation 2007.

U.S. Appl. No. 12/940,214, filed Nov. 5, 2010.

Notification of transmittal of the International Search Report and the Written Opinion for International application No. PCT/US2010/049619 dated Dec. 8, 2010.

Notification of transmittal of the International Search Report and the Written Opinion for International application No. PCT/US2010/055452 dated Jan. 17, 2011.

U.S. Appl. No. 12/864,110, filed Jul. 22, 2010.

International Search Report and Written Opinion for international application No. PCT/US2009/031744, dated May 18, 2009.

Smith, Warren J. *Modern Optical Engineering: The Design of Optical Systems*, $4^{th}$ ed. New York: McGraw-Hill, 2008.

International Preliminary Report on Patentability for the related International application No. PCT/US2011/059040, dated Jan. 9, 2013.

International Preliminary Report on Patentability for the related International application No. PCT/US2010/055452, dated Feb. 22, 2013.

Search Report and Written Opinion for the related International application No. PCT/US2012/065838, dated Feb. 14, 2013.

Office Action from United States Patent Office issued in related U.S. Appl. No. 12/939,267, mailed Jun. 20, 2013.

Written Opinion for International application No. PCT/US2010/049617.

International Preliminary Report on Patentability for the International Application No. PCT/US2010/049617.

International Search Report and Written Opinion for International Application No. PCT/US2011/059040.

Scharstein and Szeliski, "A Taxonomy and Evaluation of Dense Two-Frame Stereo Correspondence Algorithms"Microsoft Research, Microsoft Corporation, Redmond, WA, 2002.

Kang,Web, Zitinick, and Takeo, "A Multibaseline Stereo System with Active Illumination and Real-time Image Acquisition.", 1995.

Collins, "A Space-Sweep Approach to True Multi-Image Matching" University of Massachusetts, Amherst, MA, Feb. 1996.

Notification of transmittal of the International Search Report and the Written Opinion for International application No. PCT/US2010/04617 dated Dec. 8, 2010.

First Office Action from Chinese patent application No. 201080042290.6, dispatched Jan. 20, 2014. 18 pages.

First Office Action from Japanese patent application No. 2012-530966, dispatched on Mar. 11, 2014. 11 pages.

\* cited by examiner

76 Cross Section

US 8,894,259 B2

DARK FIELD ILLUMINATOR WITH LARGE WORKING AREA

FIELD OF THE INVENTION

The present invention relates to optical image processing, and in particular to illumination of objects for purposes of automated inspection.

COPYRIGHT RESERVATION

A portion of this patent document disclosure contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Optical image processing systems find use in many industrial tasks. A central problem of many imaging systems is correct illumination of the target. Common problems with existing illuminators or illumination systems are illumination uniformity, consistent illumination direction across the target, illuminator efficiency, and illuminator size. As the area being inspected increases, these problems with existing illumination systems becomes much more intractable.

A common application for optical image processing is the inspection of printed circuit boards such as those found in computers and mobile devices. A typical application of optical image processing systems includes detecting the presence or absence of an electrical component on the circuit board and detection of a proper solder joint at the proper location on the component. The system described could as easily be applied to illumination of other objects of interest, such as semiconductor wafers, web processed materials, or mechanical piece parts, for example.

SUMMARY

An illuminator is described which may be used with large inspection areas and which provides a dark field illumination pattern that is spatially uniform, illuminates from consistent angles, has high efficiency, and is smaller than existing solutions. A light pipe has a first end proximate an object to be illuminated and a second end opposite the first end and spaced from the first end. The light pipe also has at least one reflective sidewall. The first end of the light pipe includes an exit aperture and the second end has at least one opening to allow at least one image acquisition device to view the surface therethrough. At least one light source is configured to provide illumination in the light pipe. The object is illuminated by the first end of the light pipe by illumination at a selected elevation angle and substantially all azimuth angles.

BRIEF DESCRIPTION OF THE DRAWINGS

FIGS. 9b, 9c are plots of the input and output of the illuminator shown in FIG. 9a.

DETAILED DESCRIPTION OF ILLUSTRATIVE EMBODIMENTS

It is desirable to collect images of printed circuit boards (PCB) at high speed with high resolution and at a low cost. A typical circuit board may be a rectangle 200-300 mm on a side and must be scanned in less than 10 seconds to keep up with ever increasing production line rates. Traditionally these boards were scanned with a single camera imaging a small area (the area imaged is referred to as the Field Of View or FOV), the camera FOV is moved over the board by a two axis robotic system. A typical camera might have 1 million pixels in a 1,024×1,024 array. A 20 micron pixel size on a PCB results in a 20 mm field of view. To scan a typical circuit board, the camera must collect more than 100 images, requiring the same number of motion steps. As camera costs have decreased and camera resolutions (pixel count) have increased other architectures became more cost effective. One low cost camera architecture uses either a line scan detector or a row of 2D (area array) cameras. Such cameras are able to image the entire width of a PCB at once. By moving the PCB across the camera field (or moving the camera relative to the PCB), images of the entire target (PCB) may be captured in one motion step. The cost of extra cameras is more than made up for by the elimination or simplification of the expensive robotic motion system. This line or array or 2D cameras (or line scan camera(s)) will be referred to as a bar camera in this document. Bar cameras typically have very asymmetric FOVs; a bar using a row of area array cameras may have a 300 mm×30 mm effective FOV, whereas a line scan camera in the same application may have a 300 mm×0.1 mm FOV.

Figure 1:
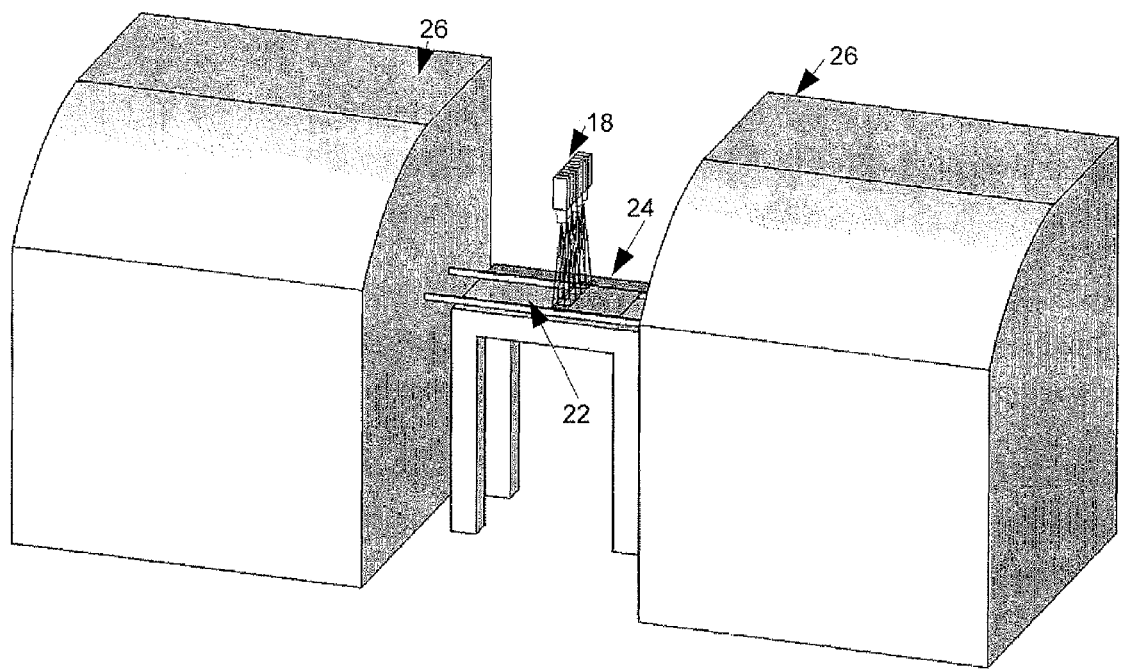
FIG. 1 is a diagrammatic view of a bar camera installed onto a PCB conveyor.
Figure 2:
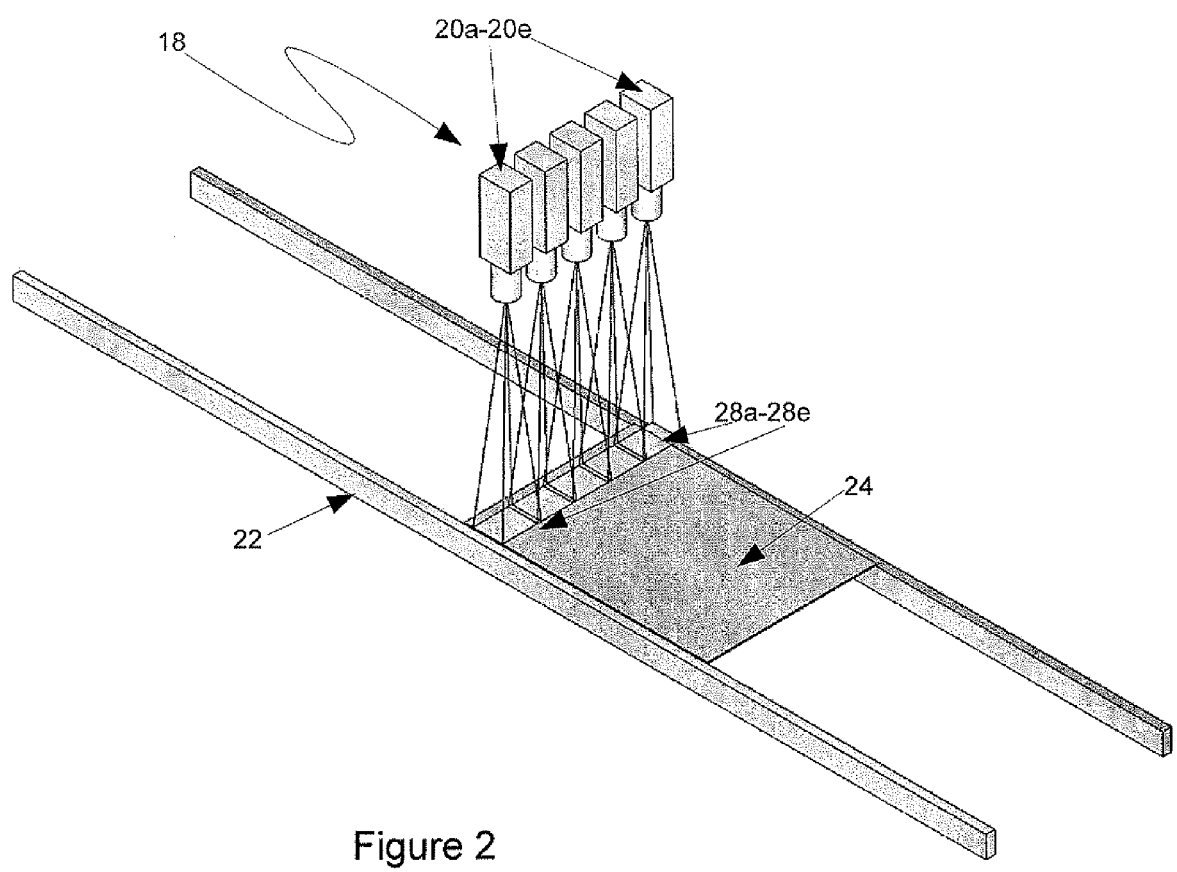
FIG. 2 is a more detailed diagrammatic view of a bar camera inspecting a PCB on a conveyor.

FIG. 1 shows a bar camera 18 placed over a conveyor 22 carrying a PCB 24 between two machines 26 (for example a component placer and an oven) on a printed circuit assembly line. FIG. 2 shows the placement of the row of cameras 20a-20e in the bar camera 18 over the PCB 24 traveling down the conveyor 22. In this arrangement the field of view of each camera (28a-28e) form a series of overlapping rectangles on the target PCB 24, these overlapping individual FOVs are combined to make up the effective FOV of the bar camera. Not shown in the figures is a means of processing and displaying the images; typically an optical image processing system will digitize images from the camera(s) and feed them into a computer for processing. As the processing of collected images is beyond the scope of this document, the processing and user interface portions of an optical image processing system have not been shown.

Figure 3:
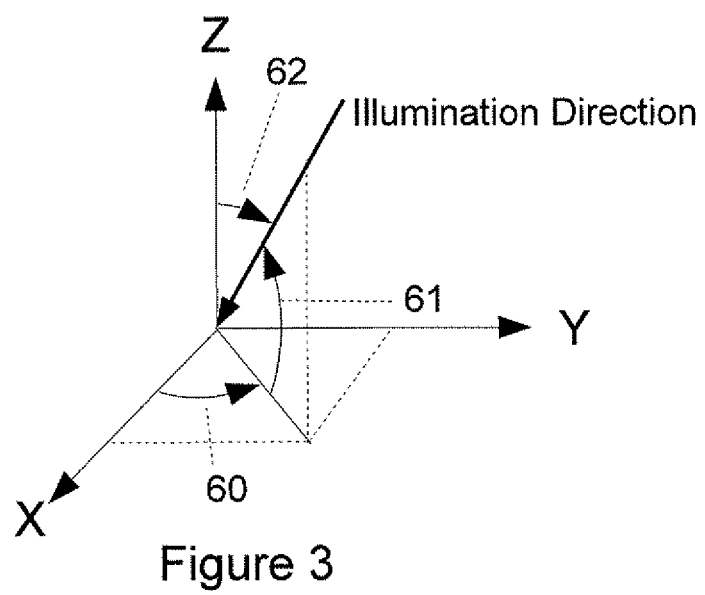
FIG. 3 is a coordinate system definition diagram.

Illumination for optical image processing applications is typically controlled in intensity (or brightness) and direction. FIG. 3 defines the coordinate system for illumination. Direction Z is normal to the object (and is typically the negative of the camera's optical axis). Directions X and Y define horizontal positions on the object. Angle 61 defines the elevation angle of the illumination. Angle 62 redundantly defines the ray angle with respect to normal (or angle with respect to the optical axis). Angle 60 is the azimuth angle of the ray. Illumination from nearly all azimuth and elevation angles is termed cloudy day illumination. Illumination predominantly from low elevation angles (angles near horizontal) is termed Dark Field illumination. Illumination predominantly from high elevation angles is termed Bright Field illumination (the terms Bright Field and Dark Field are borrowed from the field of microscopy). A good illumination system will create a light field with uniform irradiance across the camera's FOV (spatial uniformity) and will illuminate from consistent angles across the FOV (angle uniformity). As explained below, an illumination system with poor angle uniformity may result in measurement errors.

Optical image processing systems must illuminate the target (a printed circuit board in described example) such that features of interest are visible to the camera(s). An optical image processing system's illuminator (ideally) is energy efficient, small, low cost and provides illumination which is both spatially uniform and consistent in illumination elevation angle across the effective field of view. Illumination for traditional imaging systems was relatively easy, the small FOV allowed for small and low cost illuminators. Many vendors produce illumination devices which work for a single camera with a small FOV. Examples of bright field illuminators include Diffuse on Axis Lighting, DOAL-75 part number NER-01020050 and Coaxial on Axis Lighting, COAL-50 part number NER-010204500 both available from Microscan NERLITE of Nashua, N.H. Dark field illuminators may take the form a fiber optic ring light; Fiber Optic Ring Light, part number NT54-258 available from Edmund Optics of Barrington, N.J. is a ring with an inside diameter of 89 mm. Dark field illuminators may also take the form of an LED ring; 5.00 inch, white, LED Darkfield illuminator, part number NT56-591 available from Edmund Optics is an LED ring with 32 mm field coverage in a 5" (127 mm) diameter package.

Figure 4:
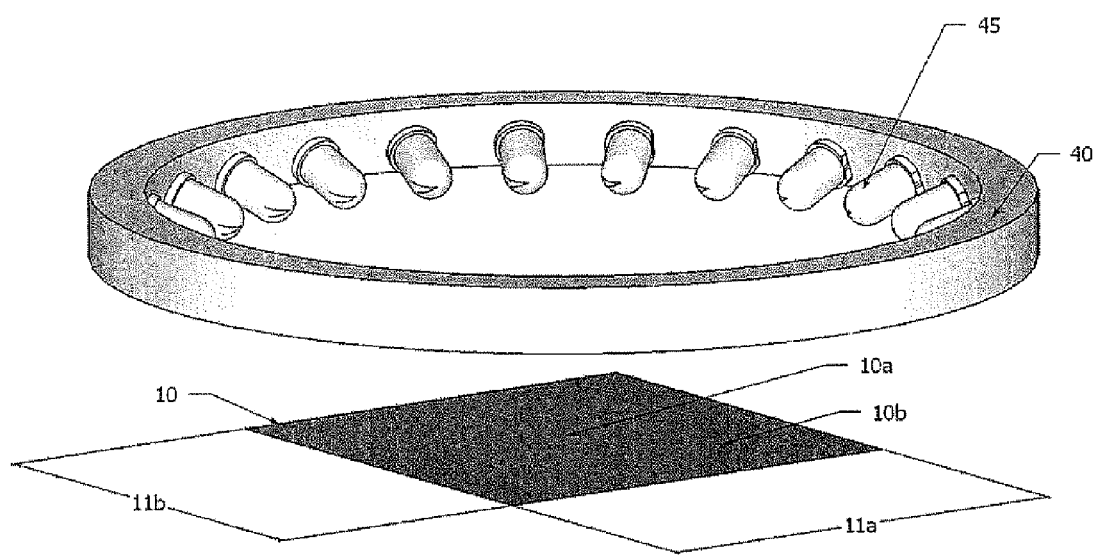
FIG. 4 is a diagrammatic view of an LED ring light.
Figure 5:
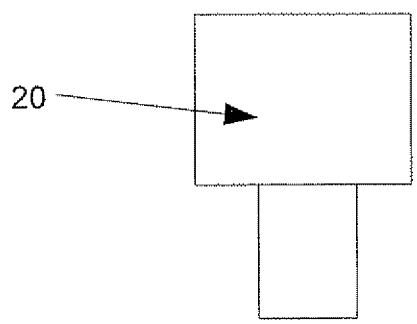
FIG. 5 is a diagrammatic cross section of an LED ring light.
Figure 5:
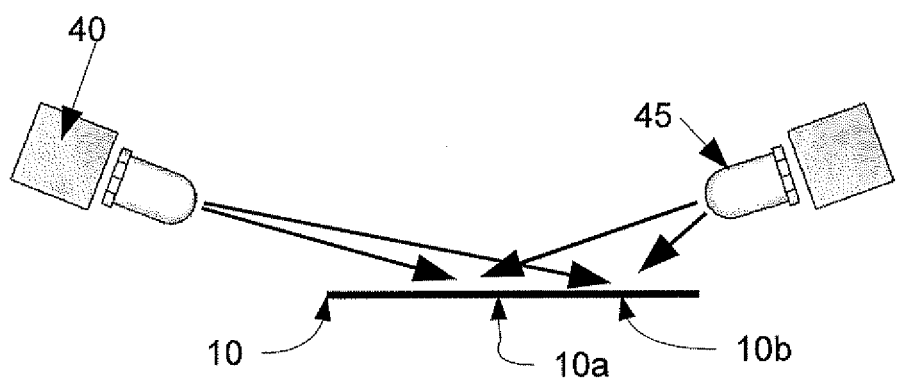
Figure 6A:
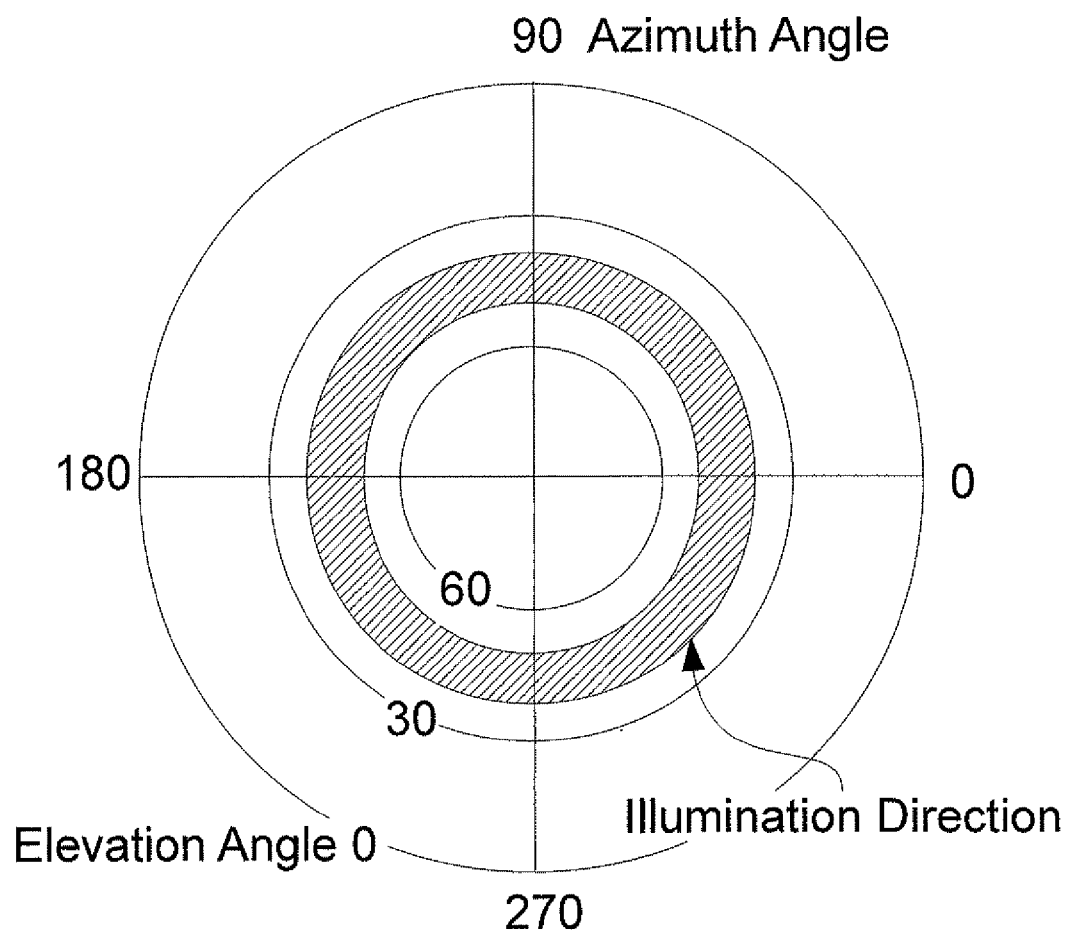
FIGS. 6a, 6b are polar plots of the LED ring light relative to positions 10a and 10b in FIG. 5, respectively.
Figure 6B:
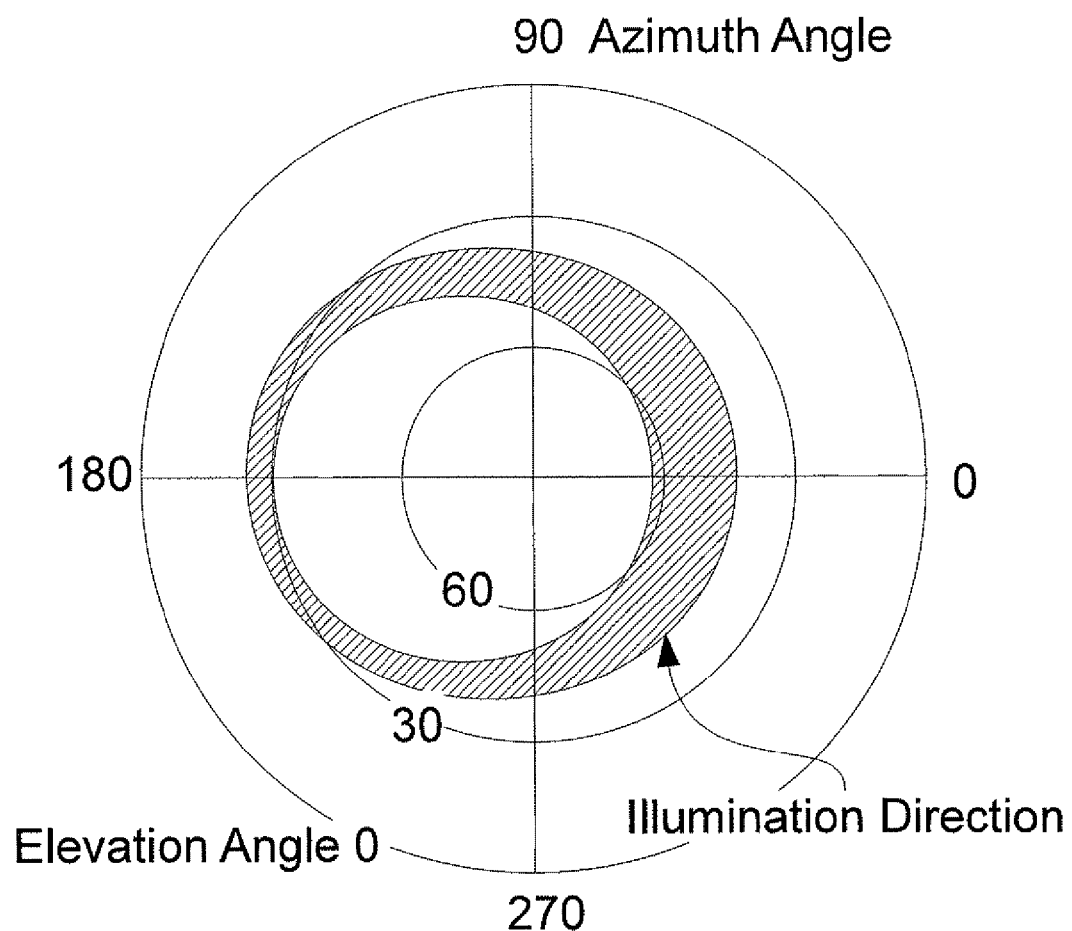

Bar cameras have much larger FOVs and operate poorly with existing lighting methods. FIG. 4 shows a ring light (much like the LED ring described above), a ring 40 supports a number of LEDs 45 which are directed towards the camera's FOV 10 of dimensions 11a by 11b. FIG. 5 is a cross section of the ring illuminating objects at both the center 10a and edge of the working area 10b. A camera 20 collects light reflected from the FOV 10. FIG. 6 shows polar plots of the light received at points 10a (see FIG. 6a) and 10b (see FIG. 6b) of the FOV. The two axis polar plot shows elevation angle going from 0 (horizontal illumination) at the periphery of the plot to 90 degrees (vertical illumination) at the center of the plot, azimuth angle is marked out around the circumference of the plot. A marked spot in the plot (hatched region) indicates that light is received from the indicated azimuth and elevation angles. Position 10a, which is at the center of the illuminator's working area (and the camera's FOV), is illuminated from all sides equally, as the distance to all LEDs 45 on the ring are the same the illumination brightness does not vary with azimuth angle and the illumination elevation angle does not vary with azimuth. FIG. 6a shows this symmetrical illumination pattern as a hatched ring of constant elevation angle and constant width. Position 10b, near the edge of the illuminator is not symmetrically illuminated. One side (at an azimuth angle of 0 degrees) is illuminated from a nearby section of the ring, i.e. both more brightly and from a higher elevation angle than the other side (at an azimuth angle of 180 degrees). FIG. 6b shows these non uniform illumination directions as a de-centered asymmetrical ring. Ideally, an object should look the same in the image of camera 20 regardless of where it is in the FOV; here, two different positions in the FOV are illuminated differently, therefore identical objects at these two locations may appear to be different. To maintain even illumination only a small area near the center of the ring light is usable, the ring itself must be much larger than the FOV.

To scale up the ring light described above to work over a 300 mm wide field might require a ring greater than 1 meter in diameter. This enormous ring fails to meet market needs in several respects: the large size consumes valuable space on the assembly line, the large light source is expensive to build, the illumination angles are not consistent across the working field, and it is very inefficient—the light output will be scattered over a significant fraction of the 1 meter circle while only a slim rectangle of the board is actually imaged.

Figure 7:
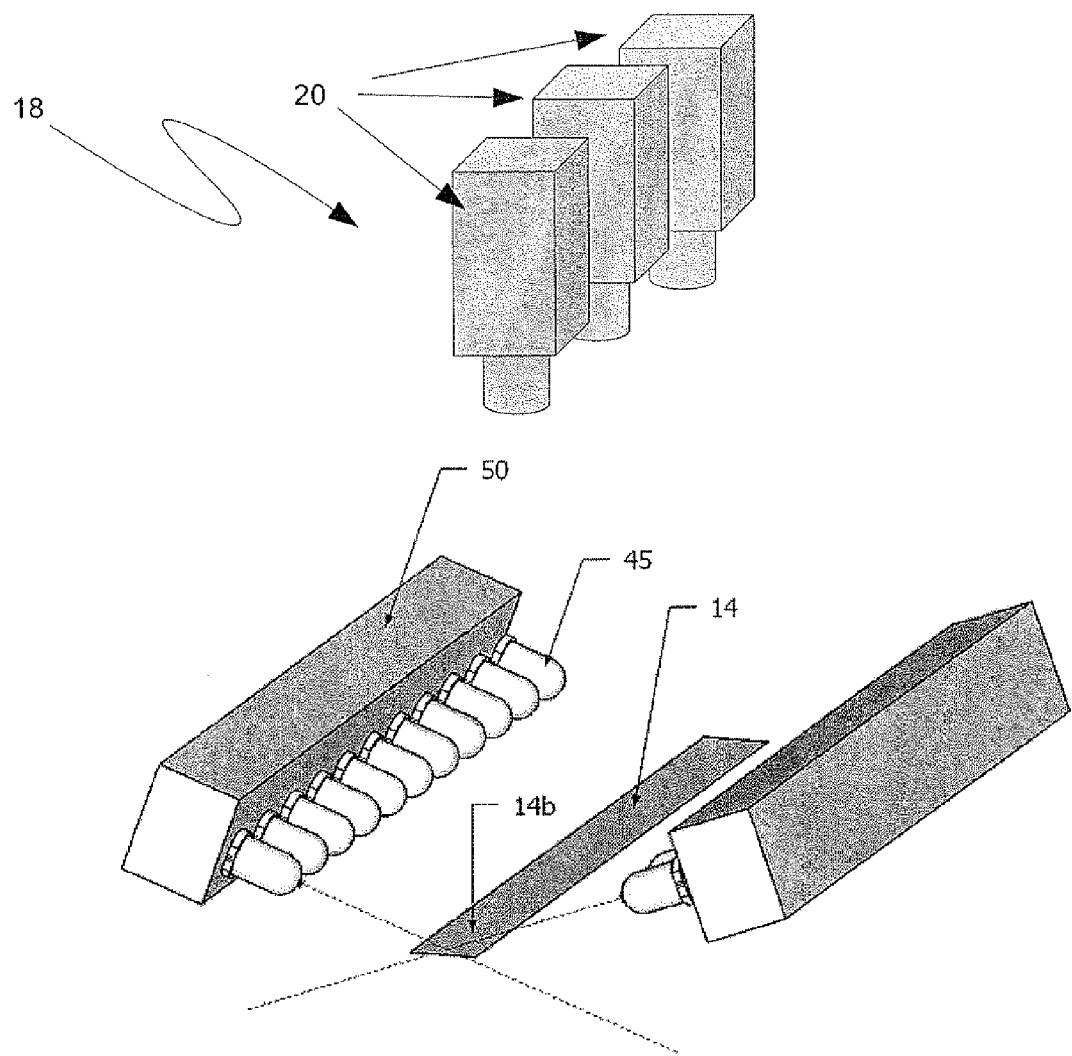
FIG. 7 is a diagrammatic view of line light sources illuminating a rectangular FOV.
Figure 8:
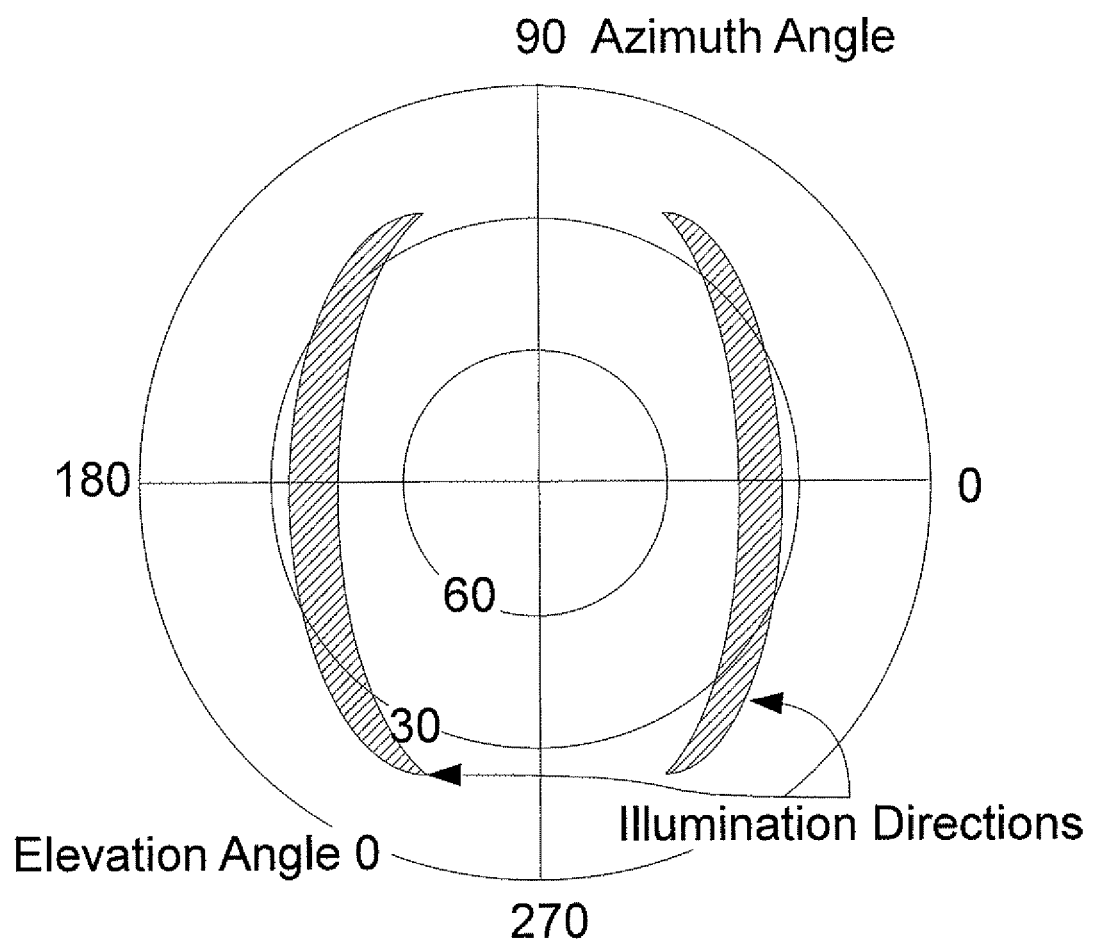
FIG. 8 is a polar plot of illumination from the illuminator shown in FIG. 7.

To deal with the large FOV found in bar cameras, manufacturers solve the cost and efficiency problem presented by the over-sized ring light by instead using light bars arrayed on either side of the effective FOV. An example light bar is the Fiber Optic Line Light Guide, part number NT53-986 available from Edmund Optics. FIG. 7 shows two linear light sources (light bars) 50, illuminating a bar camera's effective FOV 14. These light sources greatly improve efficiency compared to the ring light, light is concentrated on a narrow rectangular region instead of a large circle; the bar light source is also much smaller than the ring light solution (when applied to long, narrow FOV shapes). A disadvantage of the light bar method is that although the target receives symmetrical illumination from the two directions facing the sources, no light is received from the directions facing the long axis of the FOV. FIG. 8 is a two axis polar plot showing illumination directions for the light bar, it shows that strong illumination is received from the direction nearest to the bar (at 0 and 180 degree azimuth angles) and that no illumination received from the 90 and 270 degrees azimuth angle. As the azimuth angle varies between 0 and 90 the source elevation angle drops and the source subtends a smaller angle (so less light is received). The camera's FOV receives light which varies in both intensity and elevation angle with azimuth angle. The light bar (or line source) improves the size and efficiency of large ring light, but at the cost of worse uniformity in azimuth angle.

As described above, existing lighting systems provide illumination which varies across the working area (both in intensity and in angle). An optical device which produces a very uniform light field is sometimes used in image projectors. U.S. Pat. No. 1,577,388 describes a light pipe used to back illuminate a film gate. Commercial versions of these light pipes are available, Light Pipe Homogenizer, Model LPH- PIP-8 from Newport Corporation of Irvine, Calif. is an example. These light source homogenizers are typically solid glass rods (4 or 6 sided polygonal in cross section) which are much longer than wide (typically greater than 10 times as long as wide); the Newport Corp. model discussed above is a solid glass rod with an 8×8 mm square cross-section and a 100 mm length. In a typical application a light source (say an arc lamp) is imaged onto the input face of the rod, the output face is illuminated by the input face directly and by multiple images of the input face reflected off of the internal faces of the rod. This sum of many light sources (many images of the input arc) is spatially very uniform. In *Modern Optical Engineering*, Warren Smith explains an important characteristic of these glass rods (and of optical fibers): if a light ray enters the rod (fiber) at some angle with respect to the axis of the rod it will exit the rod (fiber) at the same angle with respect to the axis of the rod. The radial direction of the ray will be nearly random, in fact, a small collimated bundle of rays shining onto the input face at some angle with respect to the rod central axis will exit the rod as a hollow cone with a half angle the same as the input angle. This hollow cone of light is the input light beam after it has been azimuthally homogenized.

Referring back to FIG. 1, a bar camera 18 is positioned over a conveyor belt. Objects to be inspected travel down the conveyor and pass under the bar camera. A series of images of the object are collected and passed to a computer for processing using conventional machine vision tools. A typical object of interest may be a printed circuit board, these boards are often rectangles about 200-300 mm on a side.

FIG. 2 shows the bar camera 18 in more detail, in this drawing a series of area array cameras image segments of the target area. Each camera's Field Of View (FOV) images a different section of the object, the cameras working together can be thought of as a single image collector with a very large effective field of view. Instead of area array cameras some bar cameras use a series of line scan cameras or a single line scan camera with a very high pixel count. Typically the bar camera 18 is designed to inspect the entire width of the object to be inspected (a PCB in the example). Traditional area array cameras typically have square or nearly square FOVs (typically 1:1 or 4:3 aspect ratio). Bar cameras typically have very asymmetrical FOVs, a bar made up of a row of area array cameras may have a 300 mm×30 mm effective FOV, a line scan camera in the same application may have a 300 mm×0.1 mm FOV. Only light shining on this narrow rectangular portion of the object is useful, all other light is wasted (representing extra cost in both lamp life and lost energy).

Figure 9A:
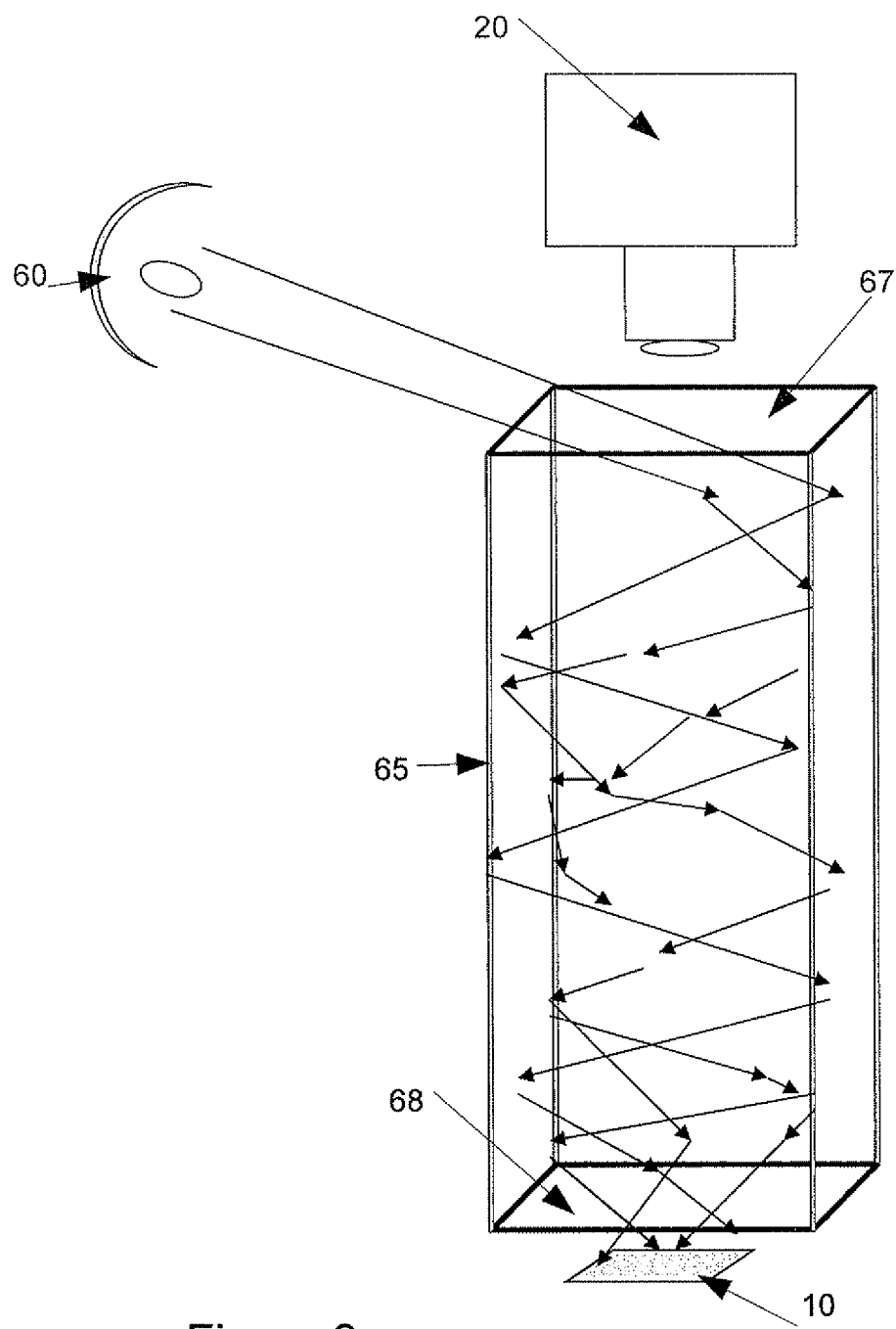
FIG. 9a is a diagrammatic view of a light pipe used as dark field illuminator in accordance with an embodiment of the present invention.
Figure 9B:
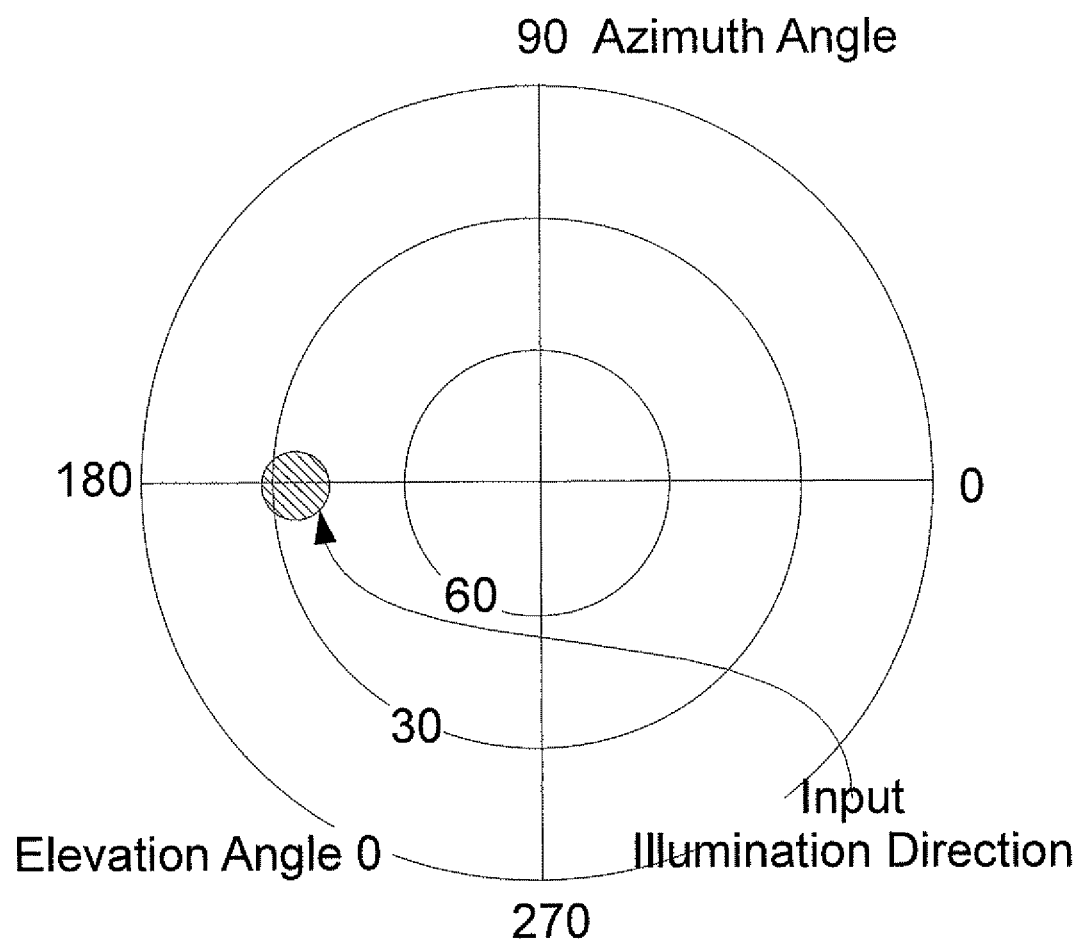
Figure 9C:
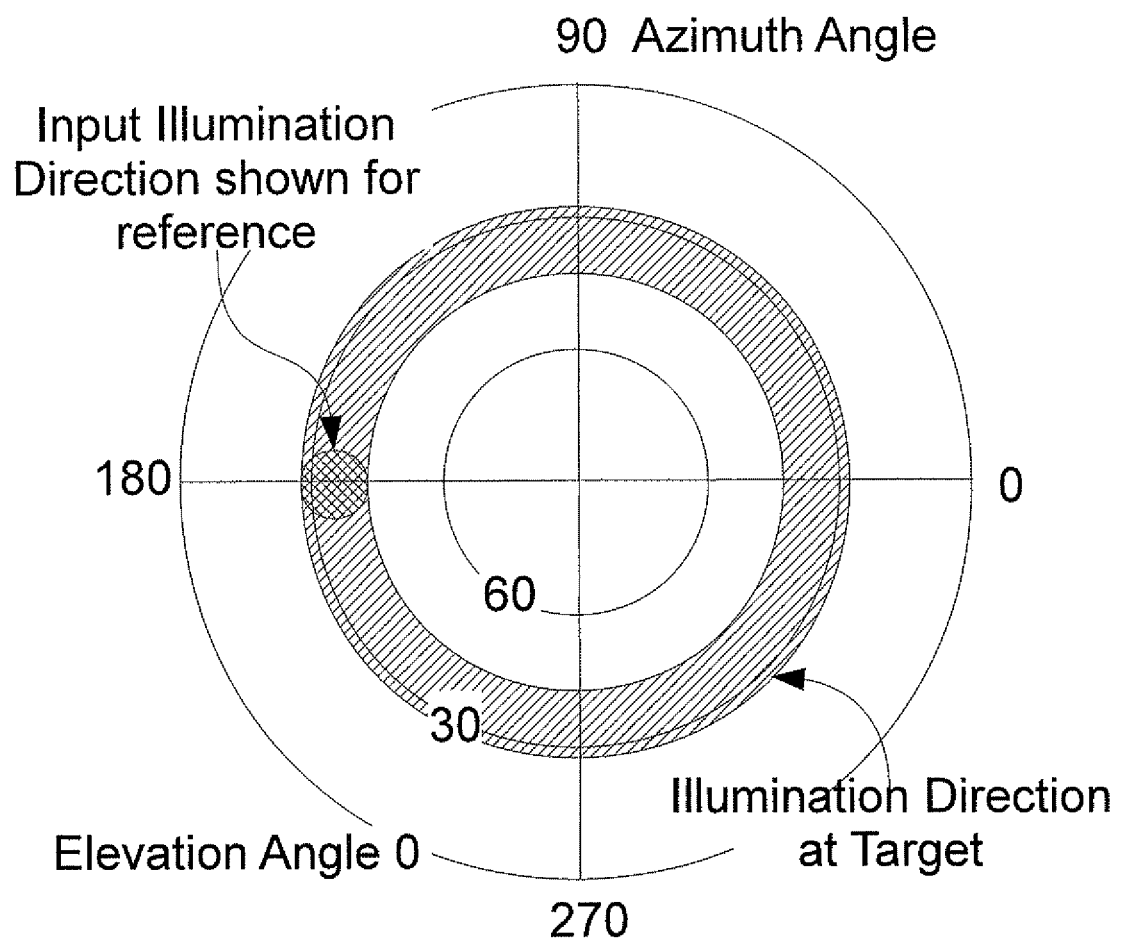

FIG. 9a shows a hollow box 65 acting as a light pipe which, when used as described, will generate a uniform dark field light pattern. Camera 20 views the target down the length of the light pipe through optical apertures at the ends of the light pipe. A light source 60 (for example an arc in a parabolic reflector) is arranged such that it projects light into the entrance aperture 67 of a light pipe (a box with internally reflecting surfaces) such that light descends at the desired elevation angle. An arc lamp with a parabolic reflector is shown, alternatively a lensed LED or other source may be used as long as the range of source elevation angles matches the desired range of elevation angles at the target. The light source may be either strobed or continuous. A strobed light source may be used to minimize the effects of motion blurring of a moving target. A continuous light source may be used with slowly moving or stationary targets. The fan of rays from the source proceeds across the pipe and downward until it strikes one of the side walls. As in the light pipe homogenizers described above, the ray fan is split and spread in azimuth at the corners of the pipe but the elevation angle is preserved. This expanded ray fan then spreads out, striking many different sections of side wall where it is further spread (randomized) in azimuth angle and largely unchanged in elevation angle. After a number of bounces all azimuth angles are present. As in the light pipe homogenizer, the exit aperture 68 (and the target 10) is spatially uniformly illuminated. Therefore all points on the target are illuminated by light from all azimuth angles but only those elevation angles present in the original source. The elevation angles of the source (as viewed at the target 10) do not change over the surface of the target. Note that the lateral extent of the source (the light pipe) is only slightly larger than the FOV, not much larger as in the case of the ring light. FIG. 9b shows the polar plot of the illumination direction at the source, a nearly collimated bundle of rays from a small range of elevation and azimuth angles. FIG. 9c is a polar plot of the rays at the target 10, the angular spread of the source is included for comparison, at the target all azimuth angles are present and the elevation angles of the source are preserved.

As the elevation angle of light exiting the illuminator is the same as those present in the source it is relatively easy to tune those angles to specific applications. If a lower elevation angle is desired then the source may be aimed closer to the horizon and the target will see light coming from those same shallow angles. The lower limit to the illumination angle is set by the standoff of the light pipe bottom edge (light can not reach the target from angles below the bottom edge of the pipe) and reduced efficiency as the number of reflections increases at shallower angles (some light is lost on each reflection). The upper limit to the illumination elevation angle is set by the length of the light pipe, several bounces (reflections) are required to randomize the illumination elevation angle, as elevation angle is increased there will be fewer bounces before reaching the target.

Figure 9D:
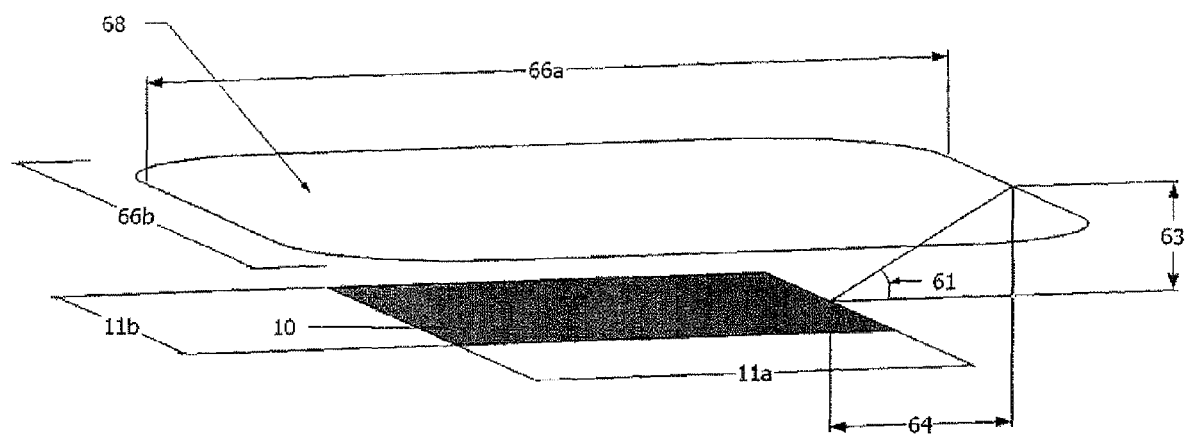
FIG. 9d diagrams a design of a light pipe exit aperture dimensions.

FIG. 9d shows the constraints on the size of aperture 68. Once the dimensions of the FOV 11a and 11b, the desired illumination elevation angle 61, and the light pipe standoff 63 (distance between the target and the bottom edge of the light pipe) have been selected, the minimum size of the light pipe exit aperture may be calculated. The minimum exit aperture size 66a and 66b must be large enough that a line from the edge of the FOV 10 ascending at illumination angle 61 is inside the exit aperture when it reaches standoff height 63. If exit aperture 68 is undersized, then the outside edges of FOV 10 will not be illuminated from the lowest illumination angles (the exit aperture vignettes the illumination pattern). If the exit aperture is oversized, then some light will be wasted as an unnecessarily large area will be illuminated.

Figure 9E:
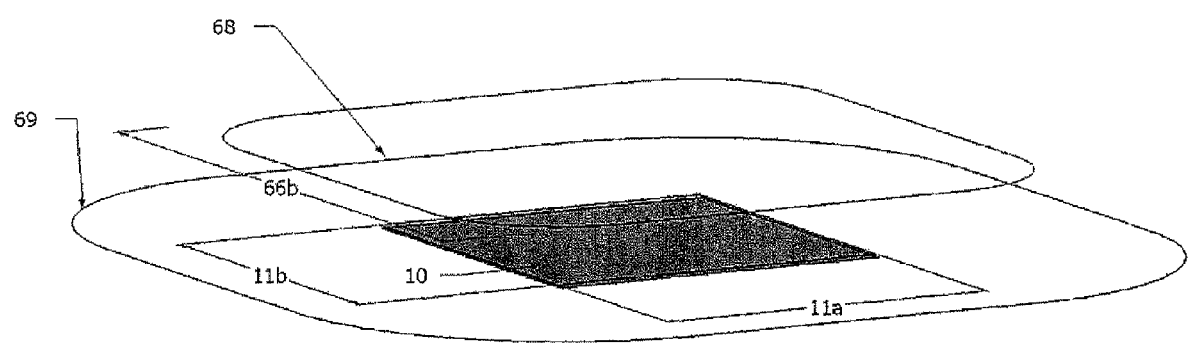
FIG. 9e is a diagrammatic view of the area illuminated by the light pipe.

FIG. 9e shows the total area illuminated by the dark field illuminator. Light exits all portions of the exit aperture at all azimuth angles, descending at the desired angle. Light strikes the level of the target covering area 69. As shown, some of the light lands inside of FOV 10, but some lands outside of FOV 10 and is therefore wasted. The fraction of wasted light is less for larger FOV sizes and shorter standoff heights. For clarity FIG. 9e shows a relatively small FOV and large standoff height.

The polygonal light pipe homogenizer only forms new azimuth angles at its corners, therefore many bounces are needed to get a uniform output (hence the large aspect ratio of the commercially available light pipe homogenizers). If all portions of the light pipe side walls could spread or randomize the light pattern (in the azimuth direction) then fewer bounces would be required and the aspect ratio of the light pipe could be reduced (making the illuminator shorter and/or wider).

FIGS. 10a-10e show a method of producing a light pipe side wall which is diffuse (or scattering) in only one axis.

Both fiber optic light guides and light pipe homogenizers transmit light without spreading the input light elevation angle (angle with respect to the axis of the guide). Light travels down the guide, reflecting off of the guide's (or pipe's) side walls, reflections may result in new azimuth angles but no new elevation angles. The elevation angle is preserved because the surface normal of the reflectors has no component in the Z axis (the optical axis of the guide). In the system described here it is preferred that the azimuth angles of the light bundle be spread on each reflection while maintaining elevation angles; this is achieved by adding curved or faceted surfaces to the side walls 70. At every point the surface normal 71 of the reflector 70 has no Z component, therefore the elevation angle of the source is maintained. The curved (or faceted) surface of the side wall creates a range of new azimuth angles on every reflection over the entire surface of the light pipe wall, therefore the azimuth angle of the source is rapidly randomized. It is obvious that the same results can be obtained by means other than curved minor surfaces, features using any combination of refraction, diffraction, and reflection could be used.

Surfaces curved in segments of a cylinder spread incoming light evenly in one axis (approximating a Lambertian surface) and do not spread light in the other axis. This shape is also easy to form in sheet metal. A sine wave shape has more curvature at the peaks and valleys and less curvature on the sides, therefore the angular spread is stronger at the edges than in the center. The cylindrical shape (more Lambertian surface) is preferred. The radius of curvature 72 and curve spacing (pitch) 73 are selected using the following criteria: The radius of curvature must be larger than the minimum bend radius of the reflector (i.e. bending a metallic reflector too sharply will damage its optical properties); smaller curve pitch produces less structure in the output light patterns. As pitch increases while radius of curvature is held the same then maximum slope angle 74 increases and steeper angles of reflection are possible. Simulation shows that as the maximum angle of the curve is increased, the reflected input beam is spread over a wider angle. That is, very small bend angles in the reflector (nearly flat) spread the incoming beam very little, while large bend angles (a deeply corrugated reflector) spread the incoming beam over a wide angle. After a 45 degree maximum bend angle (an incoming beam normal to the reflector is spread by +/−90 degrees) little is gained by further increases in bend angle.

Figure 10A:
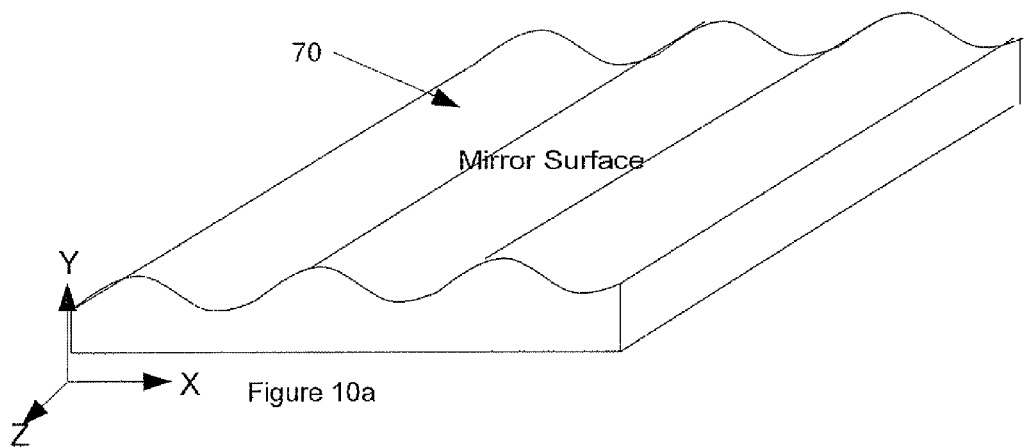
FIGS. 10a-10e are diagrammatic views of a single axis reflective diffuser useful with embodiments of the present invention.
Figure 10B:
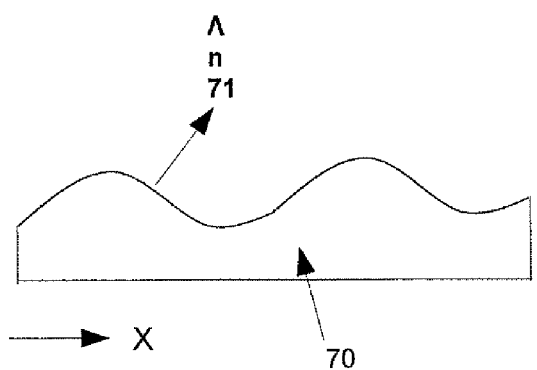
Figure 10C:
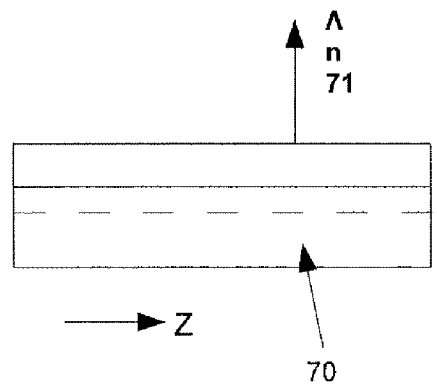
Figure 10D:
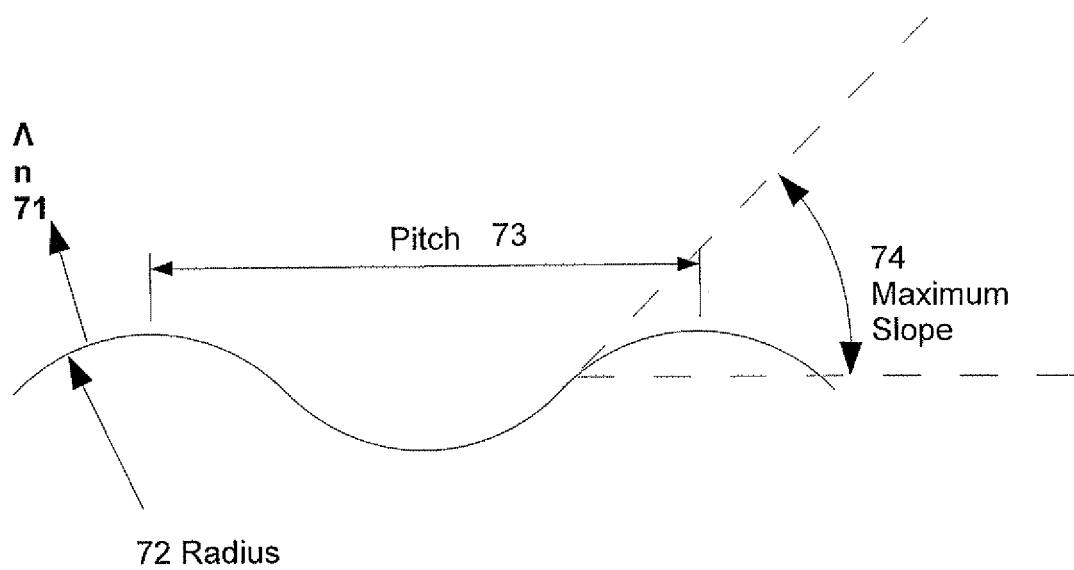
Figure 10E:
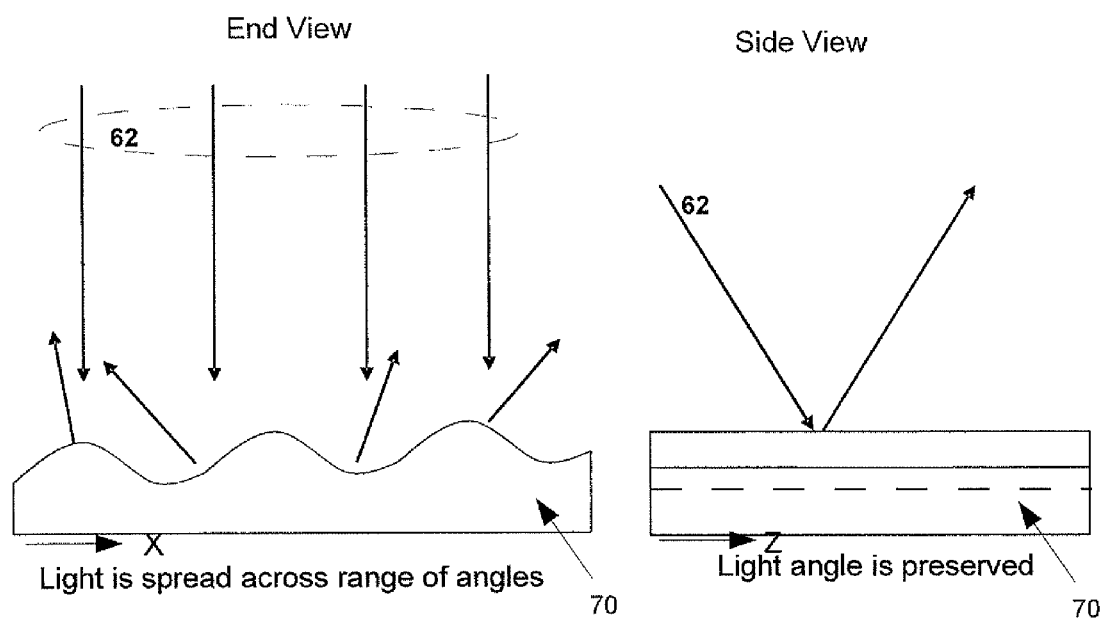

FIG. 10e shows how a collimated bundle of light rays 62 is spread perpendicular to the axis of the cylindrical bends on surface 70 and maintained in along the axis of the cylindrical bends on surface 70.

Figure 11A:
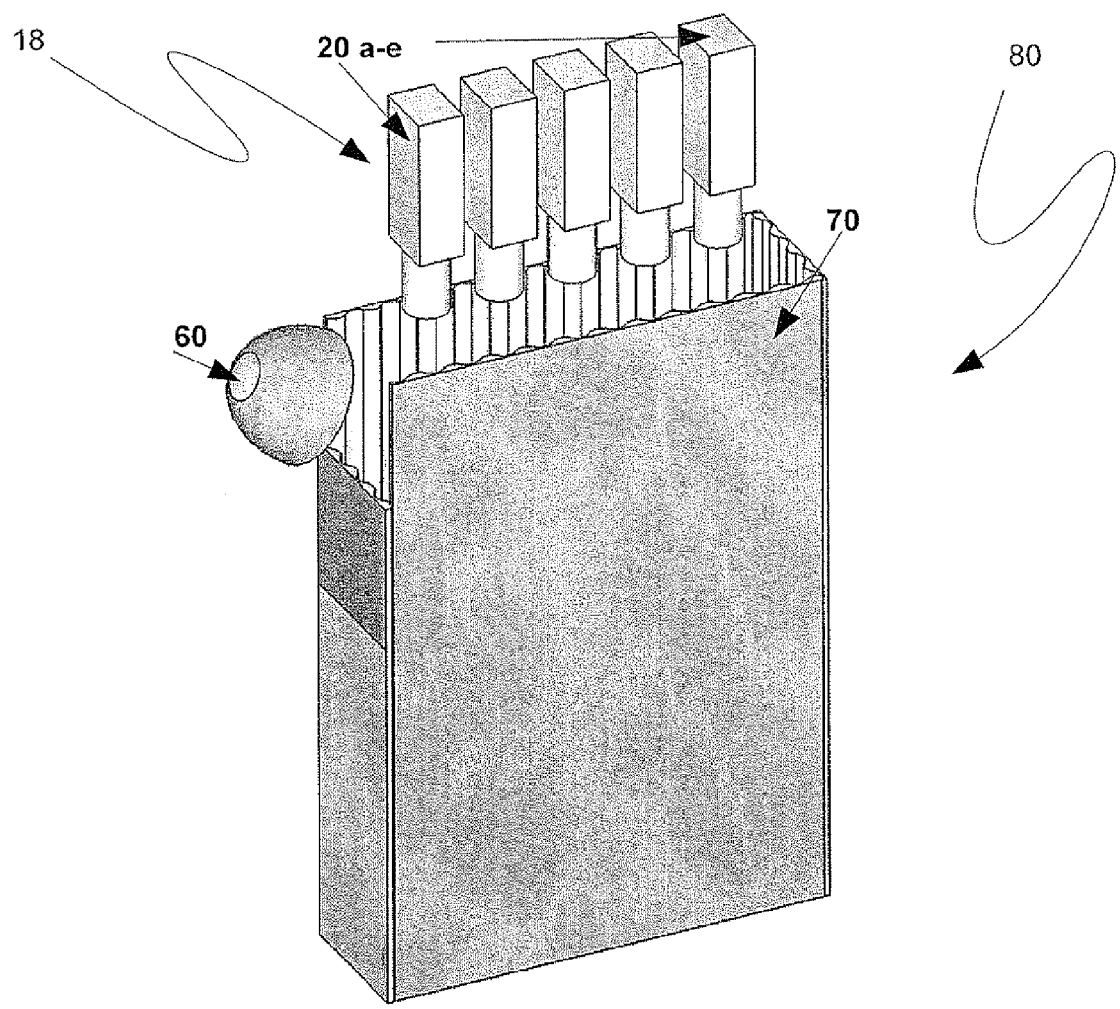
FIGS. 11a and 11b are diagrammatic views of the diffuser of FIG. 10 applied to the interior of a dark field illuminator in accordance with an embodiment of the present invention.
Figure 11B:
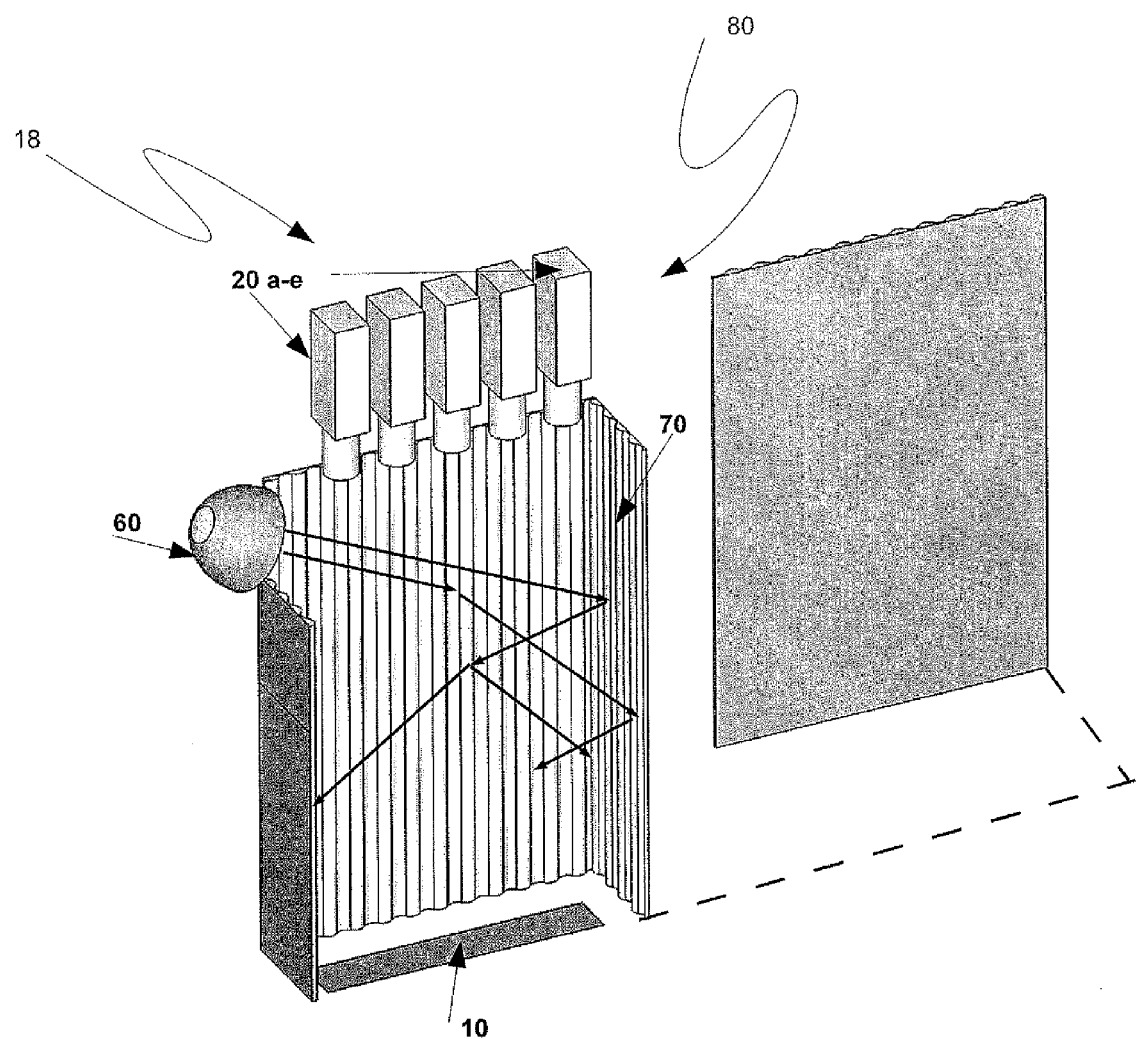

FIG. 11a shows the curved surfaces applied to a light pipe illuminator 80 for bar camera 18 made up of individual cameras 20a-e. Fewer bounces are needed as the (single axis) diffuse reflecting sides 70 randomize azimuth angles more rapidly than a flat sided box. This allows a shorter light pipe to be used (saving space and allowing the camera to be closer to the target). FIG. 11b shows how rays are randomized in azimuth angle after a small number of bounces.

FIG. 11a shows the light pipe with rectangular cross section; as is shown in FIG. 9d this is not required. The light pipe cross section may have rounded corners (slightly decreasing the output area and therefore increasing the fraction of the light reaching the target FOV). The light pipe cross section could also be curved into a circular or oval shape; that is, the single axis diffuser shown if FIGS. 10a-e could be curved into a circular or oval cross section.

Bar camera 18 views the target through openings in the first and second ends of the light pipe. The openings may be either open apertures or be of a transparent material.

Figure 12:
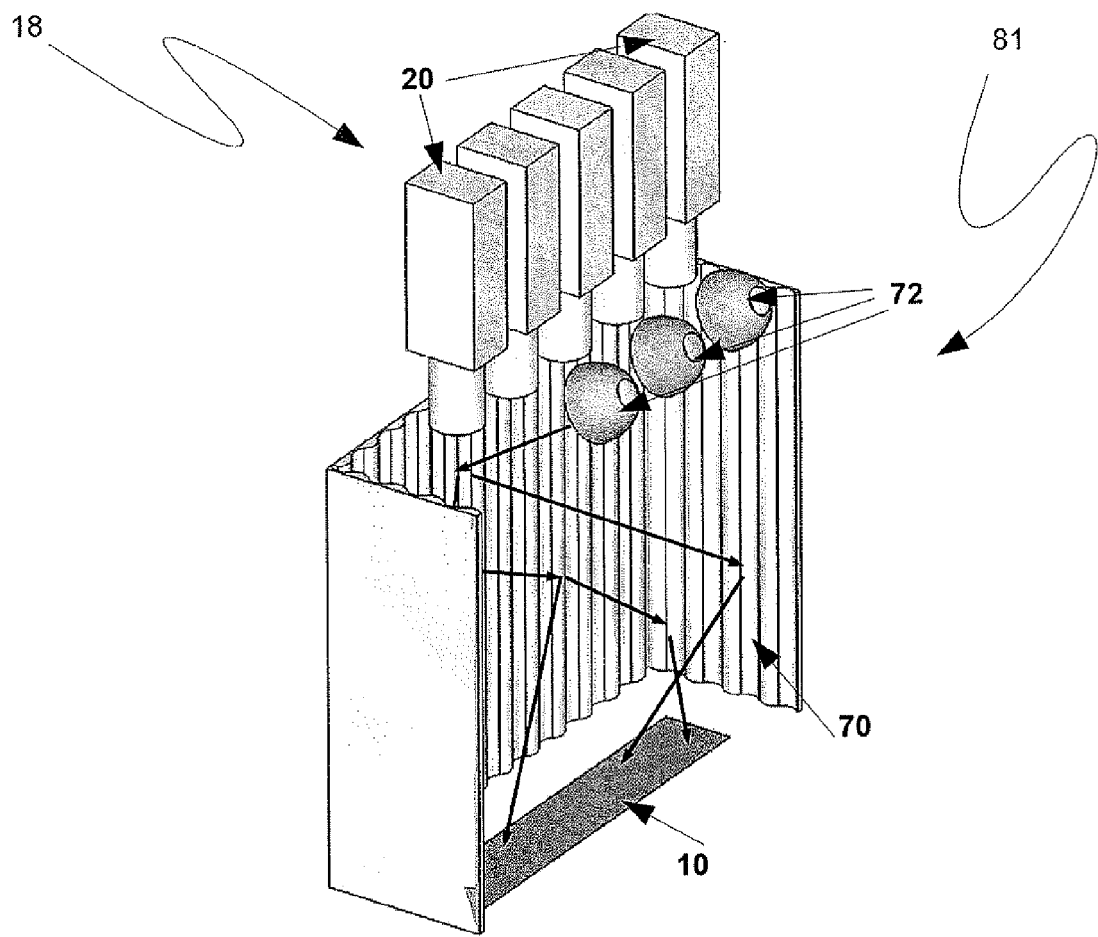
FIG. 12 is a diagrammatic view illustrating multiple light sources being applied to the system shown in FIG. 11.

The system shown in FIG. 11a can be further shortened if multiple sources are used. Multiple sources (for example a row of collimated LEDs) reduce the total number of bounces required (and hence reduce the required path length) to achieve a spatially uniform source. FIG. 12 shows this variant 81, here multiple sources 72 are illuminating the input port of the light pipe homogenizer. Launching light into the system at several points starts out the pattern as more nearly spatially uniform, reducing the path length required to achieve spatial and angular uniformity.

Figure 13A:
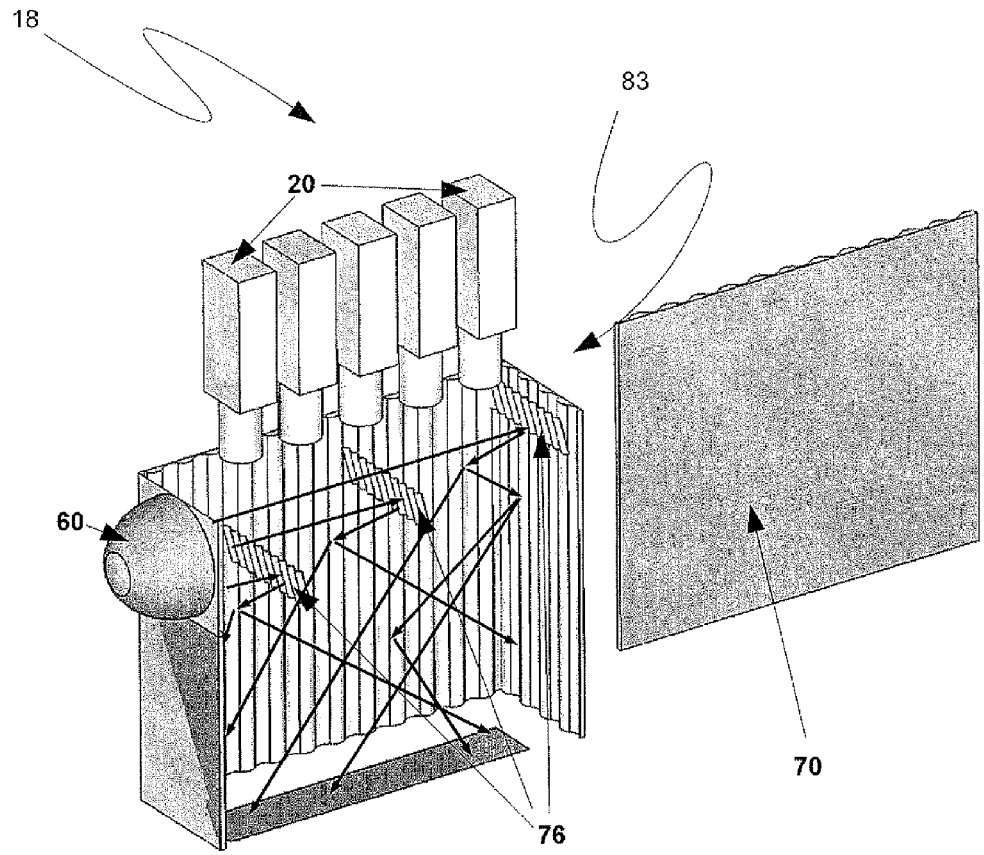
FIG. 13 is a diagrammatic view of minors substituted for the multiple light sources shown in FIG. 12 in accordance with an embodiment of the present invention.
Figure 13B:
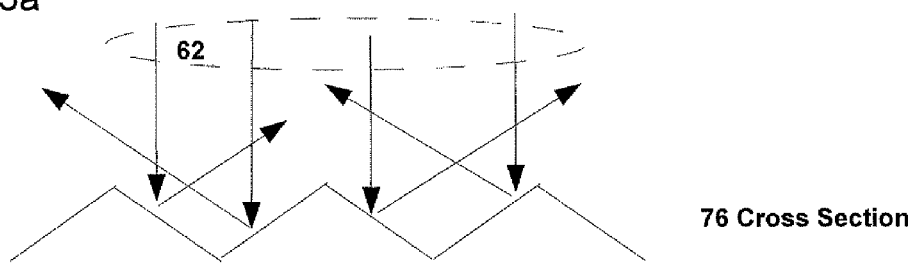

FIG. 13 shows a variant 83, mirrors 76 divert portions of the input beam (from source 60) to the desired source elevation angle. Like the multiple source method, this results in a spatially uniform light field in a shorter light pipe. In FIG. 13, the mirrors 76 are placed between cameras (to avoid blocking the view of the target) at different heights so that each mirror intercepts a portion of the light coming from source 60. It is preferred that the minors be shaped so that they reflect light at the desired elevation angle and toward the side walls (where the curved surfaces rapidly randomize the sources azimuth direction). A flat mirror bent into a series of chevrons achieves this goal.

Figure 14:
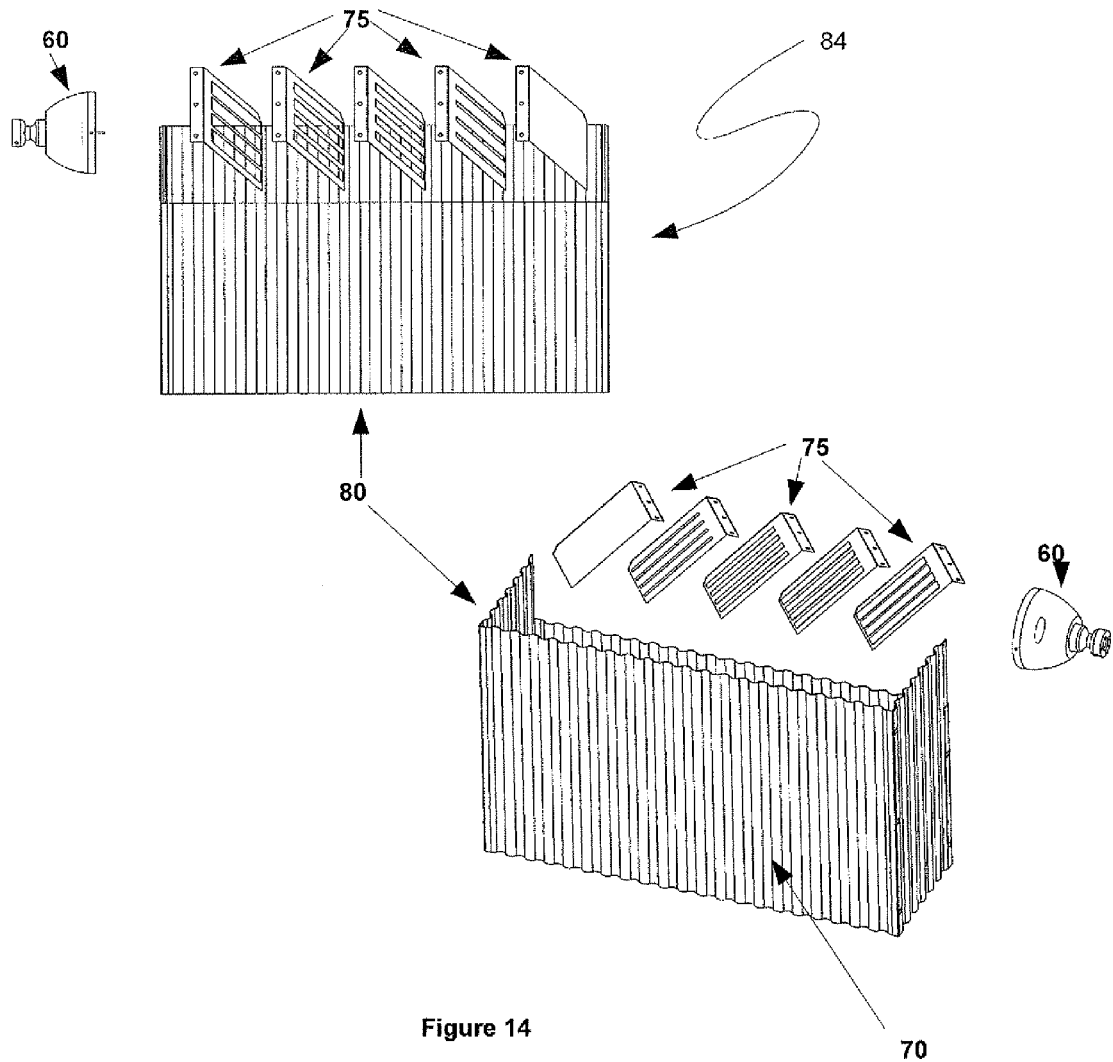
FIG. 14 is a diagrammatic view of an alternative minor to that shown in FIG. 13.

FIG. 14 shows a variation 84 of the minors as multiple source concept shown in FIG. 13. Here the light source 60 is directed horizontally near the top of the light pipe but outside of the light pipe. Minors 75 divert portions of the input beam into the light pipe at the desired elevation angles. As the mirrors 75 are outside the light pipe they do not interfere with imaging via the cameras (cameras are not shown in this figure).

The purpose of the minors shown in FIGS. 13 and 14 is to introduce light into the light pipe at several lateral positions, said light descending at the desired elevation angle. Alternatively, refractive (e.g. Fresnel prisms) or diffractive elements could be used to achieve the same results.

Figure 15:
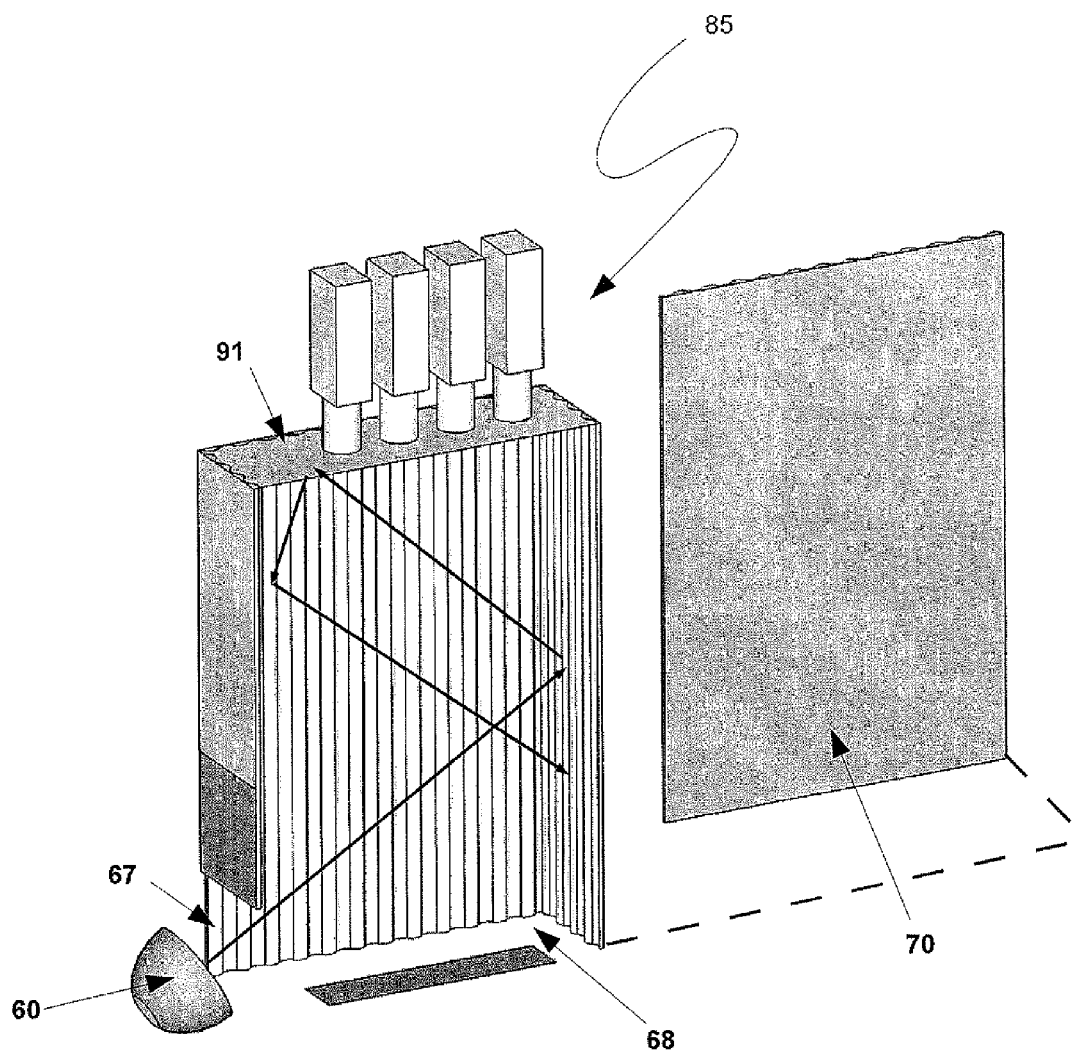
FIG. 15 is a diagrammatic view of an upwardly pointing light source.

FIGS. 13 and 14 illustrate a method of shortening the length of the light pipe while introducing light into an aperture near the top of the pipe. Alternatively light can be introduced near the bottom of the pipe and directed upwardly spreading both laterally and in azimuth angles as it ascends. If the top portion of the pipe is at least partially mirrored, then the light will be redirected downwardly. This effectively doubles the length of the light pipe resulting in better spatial and azimuthal uniformity. FIG. 15 shows this variant 85; a light source 60 directs light upwardly into the light pipe, said light may enter either through the exit aperture 68 or an entrance aperture 67 added to the side of the pipe. The top surface of the pipe has been covered by a mirror 91 (with cutouts for camera lenses); light will strike mirror 91 and redirected downward with an angle of descent equal to the angle of ascent of the source. Minor 91 may either have apertures for viewing or may be partially reflective (acting as a beam splitter).

As described so far, the light pipe has had vertical sides—there is no optical power in the Z direction. Light pipes can be constructed with some taper or power in the side walls in order to change both the illuminated area and the illumination angles. Such a scheme could be used here. If the pipe widens near the bottom, then the light field will spread to cover a larger area and the angles will become more normal to the object (higher elevation angles). Narrowing the pipe near the bottom will result in the opposite effect. Thus, embodiments of the present invention include a light pipe homogenizer with some optical power on the side walls.

Applications of this illumination method are not limited to bar camera imaging systems. The small size of the light pipe (only slightly larger than the area imaged instead of much larger as is the case of the ring light) make it useful for single camera systems with nearly square FOVs.

Although the present invention has been described with reference to preferred embodiments, workers skilled in the art will recognize that changes may be made in form and detail without departing from the spirit and scope of the invention.

What is claimed is:

1. A system for illuminating an object, the system comprising:
   a light pipe having a first end proximate the object, and a second end opposite the first end and spaced from the first end, the light pipe also having at least one reflective sidewall, and wherein the first end has an exit aperture and the second end has a plurality of openings to provide a view of the object;
   at least one strobed light source configured to provide illumination in the light pipe, wherein the object is illuminated by the first end of the light pipe by illumination at a selectable elevation angle and substantially all azimuth angles; wherein the light pipe is hollow and has a substantially constant cross-section along an axis normal to the object; and
   wherein the at least one reflective sidewall has surface features to increase illumination mixing in the azimuth angles, and wherein illumination introduced into the light pipe at the selected elevation angle has its elevation angle preserved to pass through the exit aperture at the selected elevation angle.

2. The system of claim 1, wherein the features are curved features and further wherein curved features comprise sinusoidal features.

3. The system of claim 1, wherein the features are faceted.

4. The system of claim 1, wherein the at least one light source comprises a plurality of light sources disposed to introduce illumination into the second end at the selectable elevation angle.

5. The system of claim 4, wherein the plurality of light sources introduce illumination into the second end at two distinct azimuth angles.

6. The system of claim 1, and further comprising at least one reflector disposed proximate the second end to reflect a portion of illumination from the at least one light source.

7. The system of claim 6, wherein the at least of reflector is disposed internal to the light pipe.

8. The system of claim 6, wherein the at least one reflector comprises a plurality of reflectors.

9. The system of claim 1, wherein the at least one strobed light source is configured to provide illumination into the light pipe at the selectable elevation angle.

10. The system of claim 1, wherein the exit aperture includes substantially the entire first end.

11. An electronic viewing system comprising:
    an array of image acquisition devices, the array having an effective field of view that is larger in one direction than in an orthogonal direction;
    a light pipe having a first end proximate the object, and a second end opposite the first end and spaced from the first end, the light pipe also having at least one reflective sidewall, and wherein the first end has an exit aperture shaped and sized to substantially match the effective field of view and wherein the second end has a plurality of openings to provide respective views of the object therethrough to each of the image acquisition devices of the array; and
    at least one light source configured to introduce illumination in the light pipe at a selectable elevation angle, wherein the selectable elevation angle is preserved as the illumination passes through the light pipe such that the object is illuminated by the first end of the light pipe by illumination at the selectable elevation angle and substantially all azimuth angles.

12. The system of claim 11, wherein the light pipe is shaped rectangularly.

13. The system of claim 11, wherein the light pipe is a hollow rectangular box.

14. The system of claim 11, wherein the at least one reflective sidewall has surface features to increase illumination mixing in the azimuth angles.

15. The system of claim 14, wherein the features are curved features.

16. The system of claim 14, wherein the features are faceted.

17. The system of claim 11, wherein the at least one light source comprises a plurality of light sources disposed to introduce illumination into the second end at the selected elevation angle.

18. The system of claim 17, wherein the plurality of light sources introduce illumination into the second end at two distinct azimuth angles.

19. The system of claim 11, and further comprising at least one reflector disposed proximate the second end to reflect a portion of illumination from the at least one light source.

20. The system of claim 19, wherein the at least one reflector comprises a plurality of reflectors.

21. The system of claim 11, wherein the at least one light source comprises a strobed light source.

22. The system of claim 11, wherein the at least one light source comprises a continuous light source.

23. The system of claim 11, wherein the exit aperture includes substantially the entire first end.

* * * * *

UNITED STATES PATENT AND TRADEMARK OFFICE
CERTIFICATE OF CORRECTION

Page 1 of 1

PATENT NO. : 8,894,259 B2
APPLICATION NO. : 12/564131
DATED : November 25, 2014
INVENTOR(S) : Haugan et al.

It is certified that error appears in the above-identified patent and that said Letters Patent is hereby corrected as shown below:

In the Specification:

Column 2, Line 24:

"minors" should read "mirrors"

Column 2, Line 27:

"minor" should read "mirror"

Column 8, Line 21:

"minors" should read "mirrors"

Column 8, Line 26:

"minors" should read "mirrors"

Column 8, Line 34:

"minors" should read "mirrors"

Signed and Sealed this
First Day of March, 2016

Michelle K. Lee
*Director of the United States Patent and Trademark Office*